(12) United States Patent
Novak et al.

(10) Patent No.: US 6,771,510 B1
(45) Date of Patent: Aug. 3, 2004

(54) EXPANSION CARD RETENTION DEVICE

(75) Inventors: Jeremy P. Novak, Minneapolis, MN (US); Curtis E. Larsen, Mounds View, MN (US)

(73) Assignee: Unisys Corporation, Blue Bell, PA (US)

( * ) Notice: Subject to any disclaimer, the term of this patent is extended or adjusted under 35 U.S.C. 154(b) by 67 days.

(21) Appl. No.: 10/330,713

(22) Filed: Dec. 27, 2002

(51) Int. Cl.[7] .............................. G06F 1/16; H05K 7/14
(52) U.S. Cl. ...................... 361/727; 361/683; 361/796; 211/4.02; 439/327
(58) Field of Search ................................ 361/683, 684, 361/736, 801, 759, 760, 752, 796, 756, 825, 807, 810, 765, 753, 802, 727, 741, 724, 788, 797; 292/63, 64.71; 24/521–571; 248/680, 681; 211/41.17; 220/4.02; 439/327

(56) References Cited

U.S. PATENT DOCUMENTS 4,821,145 A  * 4/1989  Corfits et al. ............... 361/692
6,487,089 B1 * 11/2002 Otis ........................... 361/796
6,634,898 B2 * 10/2003 Clements .................... 439/327

* cited by examiner

Primary Examiner—Darren Schuberg
Assistant Examiner—Anthony Q. Edwards
(74) Attorney, Agent, or Firm—Charles A. Johnson; Mark T. Starr; Merchant & Gould

(57) ABSTRACT

An expansion card retention device including a frame, a slider slidably mounted to the frame and a flap hingedly mounted to the frame. The frame is positioned above a card slot configured to receive an expansion card inserted through an opening in the frame. The flap is movable between a captive position where the flap covers the opening and a free position where the flap in clear of the opening. The slider is movable between a locked position where the slider holds the flap in the captive position and an unlocked position where the flap is free to move from the captive to the free position. A computer chassis including an expansion slot for receiving an expansion card and a card retention device mounted above the slot to a card support.

17 Claims, 18 Drawing Sheets

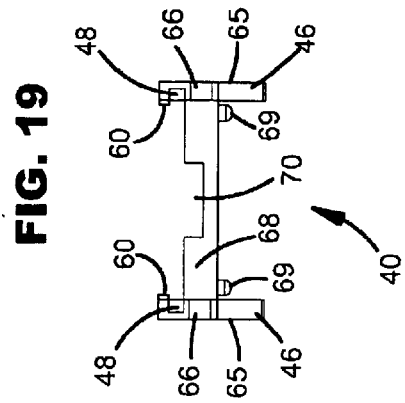
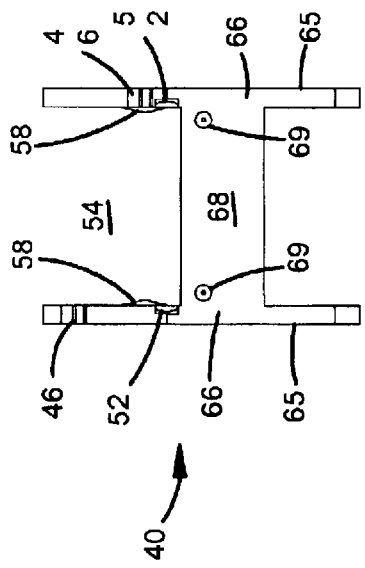
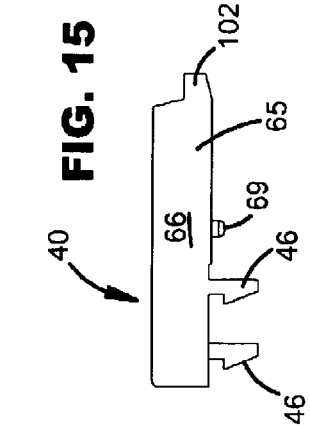
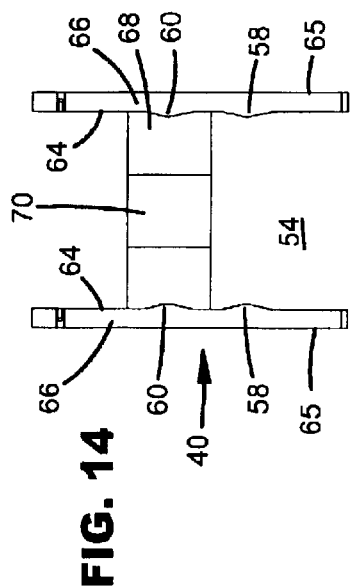
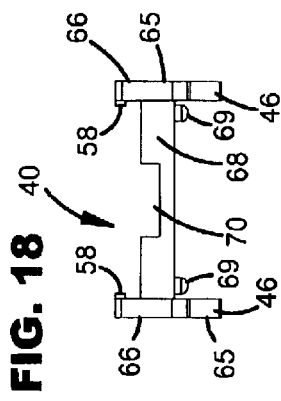
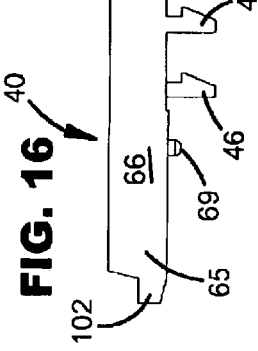

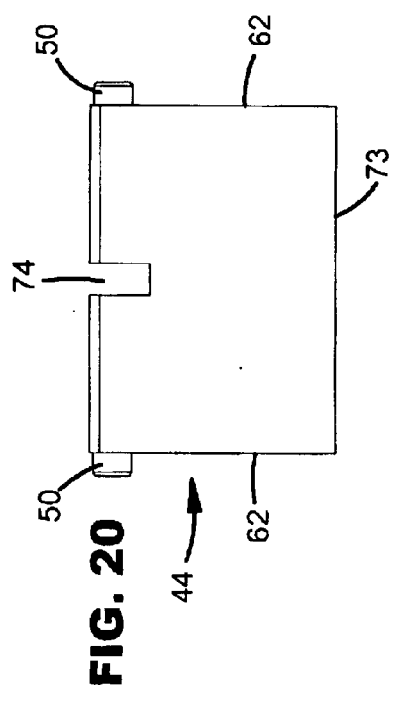
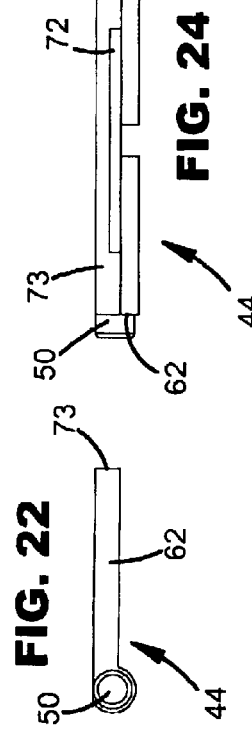
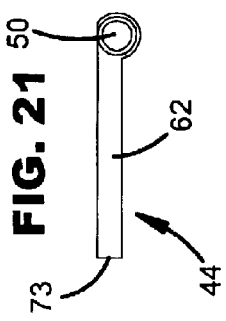
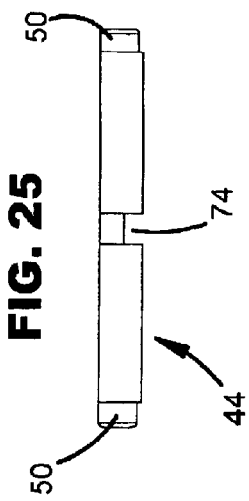
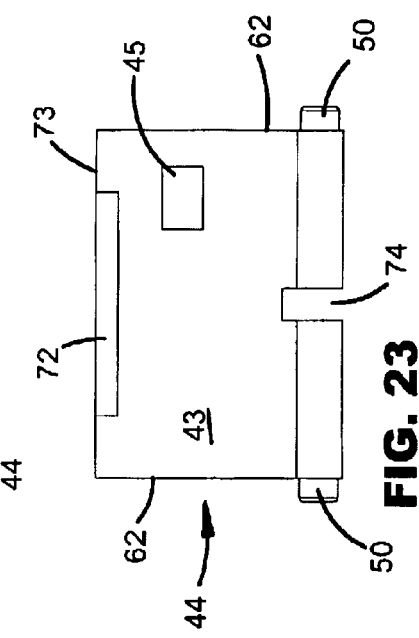

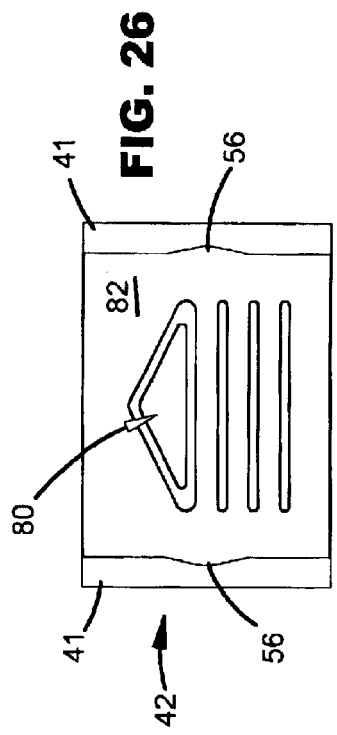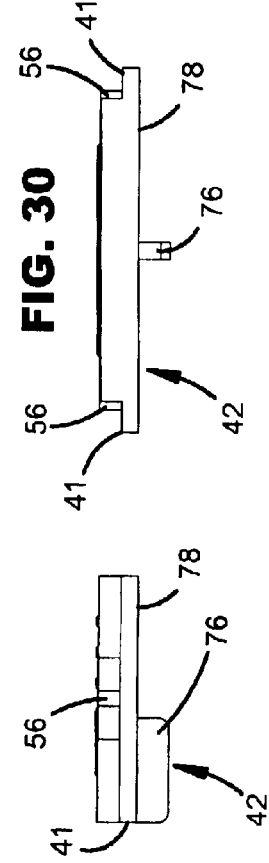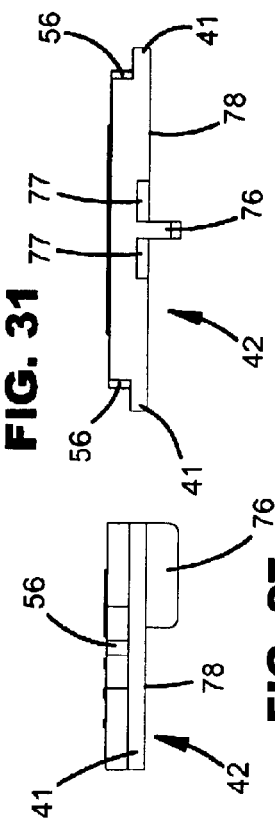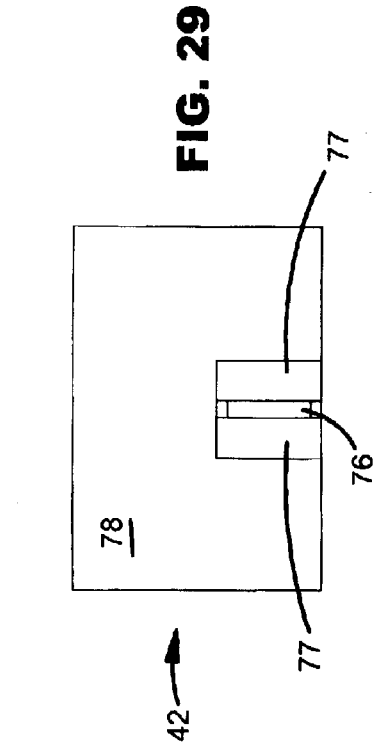

EXPANSION CARD RETENTION DEVICE

FIELD OF THE INVENTION

The present invention relates generally to retention of one or more expansion cards installed within a computer chassis.

BACKGROUND OF THE INVENTION

Peripheral Component Interface (PCI) cards are often used to add functions and capabilities to computers. These cards include card edge contacts and are installed in a computer by insertion into a mating slot on a circuit board of the computer. These cards may extend perpendicularly from the circuit board and some means of support the card may be provided by an adjacent portion of the computer chassis. The PCI cards may be releasably attached to the means of support to prevent the cards from being disturbed from the slot and to prevent adjacent cards from contacting each other. Often, the releasable attachment is accomplished by the use of tools and typically some sort of removable fastener, such as a screw. A bracket may be attached to one end of the card and screwed to a card support or a wall of the chassis. Improvements to the attachment and release of expansion cards from slots within a computer chassis are desirable.

PCI cards and the computers which receive them have been configured to permit hot swapping or plugging. This allows a card to be removed or installed from a slot in the computer without shutting the computer down. To accomplish this hot plug, the power supplied to the slot must be turned off prior to the removal or insertion of a card. Improvements to the powering or depowering of card slots for the insertion or removal of cards from the slots are desirable.

Each card slot for receiving a PCI card within a computer chassis may have a first LED indicating whether the slot is currently powered up, and a second LED indicating the fault status of the slot. Often, these LEDs are mounted to the circuit board to which the slot is mounted and are located adjacent the card slot. Space on the circuit board may be crowded adjacent the card slot, making relocation of the LEDs desirable. Further, LEDs placed on the circuit board may be difficult to see from outside the chassis. It is desirable to improve the visibility of these LEDs while keeping them adjacent to the card slot they are associated with.

SUMMARY OF THE INVENTION

The present invention relates to a card retention device which includes a frame, a slider and a flap. The frame defines an opening through which an expansion card may be inserted into or removed from an expansion slot. The flap is hingedly mounted to the frame and movable between a captive position where the flap covers the opening and a free position where the flap does not cover the opening. The slider is slidably mounted to the frame and movable between a locked position where the slider holds the flap in the captive position and an unlocked position where the flap is free to move from the captive to the free position.

The present invention further relates to a computer chassis including an expansion slot for receiving an expansion card and a card support extending adjacent the slot. A card retention device is mounted to card support and includes a frame, a slider and a flap. The frame defines an opening through which an expansion card may be inserted into or removed from an expansion slot. The flap is hingedly mounted to the frame and movable between a captive position where the flap covers the opening and a free position where the flap does not cover the opening. The slider is slidably mounted to the frame and movable between a locked where the slider holds the flap in the captive position and an unlocked position where the flap is free to move from the captive to the free position.

BRIEF DESCRIPTION OF THE DRAWINGS

The accompanying drawings, which are incorporated in and constitute a part of the specification, illustrate several aspects of the invention and together with the description, serve to explain the principles of the invention. A brief explanation of the drawings is as follows:

FIG. 14 is a top view of a frame of the card retention device of FIG. 8.

FIG. 15 is a first side view of the frame of FIG. 14.

FIG. 16 is a second side view of the frame of FIG. 14.

FIG. 17 is a bottom view of the frame of FIG. 14.

FIG. 18 is a first end view of the frame of FIG. 14.

FIG. 19 is a second end view of the frame of FIG. 14.

FIG. 20 is a top view of the card retention flap of the card retention device of FIG. 9.

FIG. 21 is a first side view of the card retention flap of FIG. 20.

FIG. 22 is a second side view of the card retention flap of FIG. 20.

FIG. 23 is a bottom view of the card retention flap of FIG. 20.

FIG. 24 is a first end view of the card retention flap of FIG. 20.

FIG. 25 is a second end view of the card retention flap of FIG. 20.

FIG. 26 is a top view of the slider of the card retention device of FIG. 8.

FIG. 27 is a first side view of the slider of FIG. 26.

FIG. 28 is a second side view of the slider of FIG. 26.

FIG. 29 is a bottom view of the slider of FIG. 26.

FIG. 30 is a first end view of the slider of FIG. 26.

FIG. 31 is a second end view of the slider of FIG. 26.

DETAILED DESCRIPTION OF THE PREFERRED EMBODIMENT

Reference now will be made in detail to exemplary aspects of the present invention that are illustrated in the accompanying drawings. Wherever possible, the same reference numbers will be used throughout the drawings to refer to the same or like parts.

Figure 1:
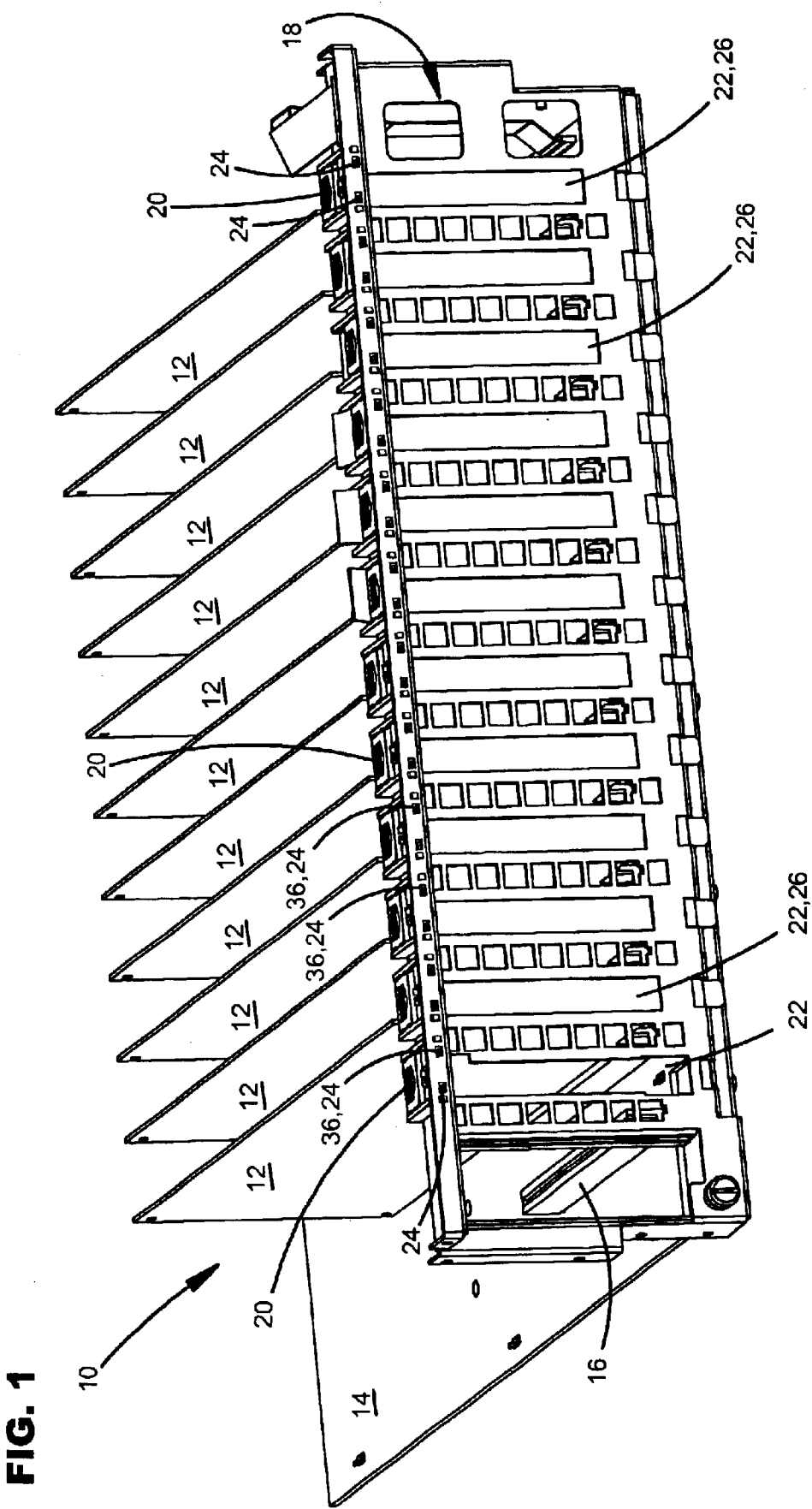
FIG. 1 is a first perspective view of a portion of a computer chassis including features according to the present invention.

It is well known in the computer industry to provide circuit boards 14 within a computer chassis 10 to accept one or more expansion cards 12, as shown in FIG. 1. Expansion cards 12 may be used to provide additional input/output capabilities, network connections, additional memory or computational devices. Cards 12 mate with slots 16 on circuit board 14 and electrically connected into an internal bus of the computer. Cards 12 are shown extending perpendicularly from board 14 and are only physically connected to board 14 by card edge connectors which are received in slot 16. A card support 18 is provided in chassis 10 to connect with an edge of expansion cards 12 and provide additional support to cards 12.

Figure 6:
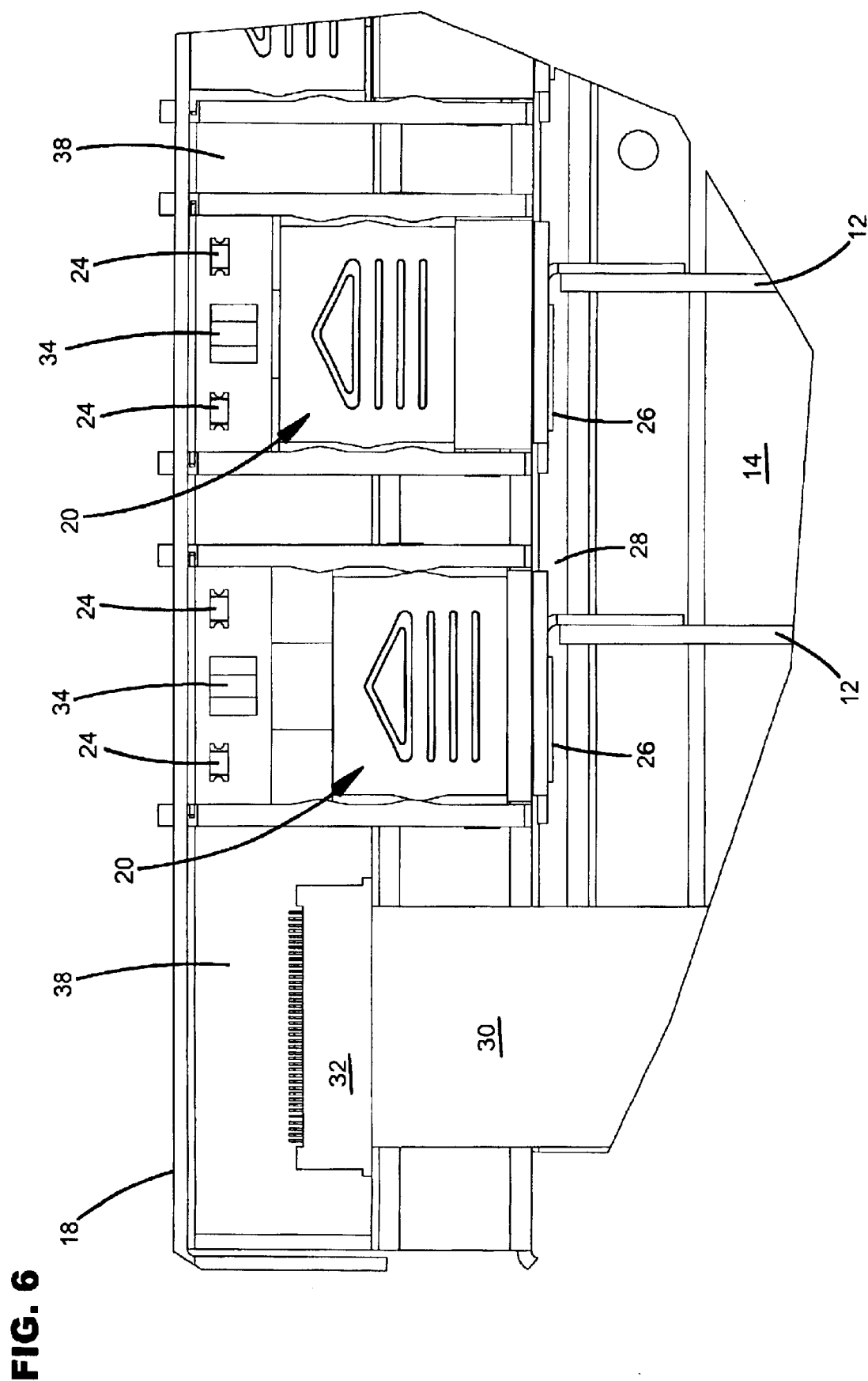
FIG. 6 is a closer view of area within the circle marked 6 of FIG. 4.
Figure 7:
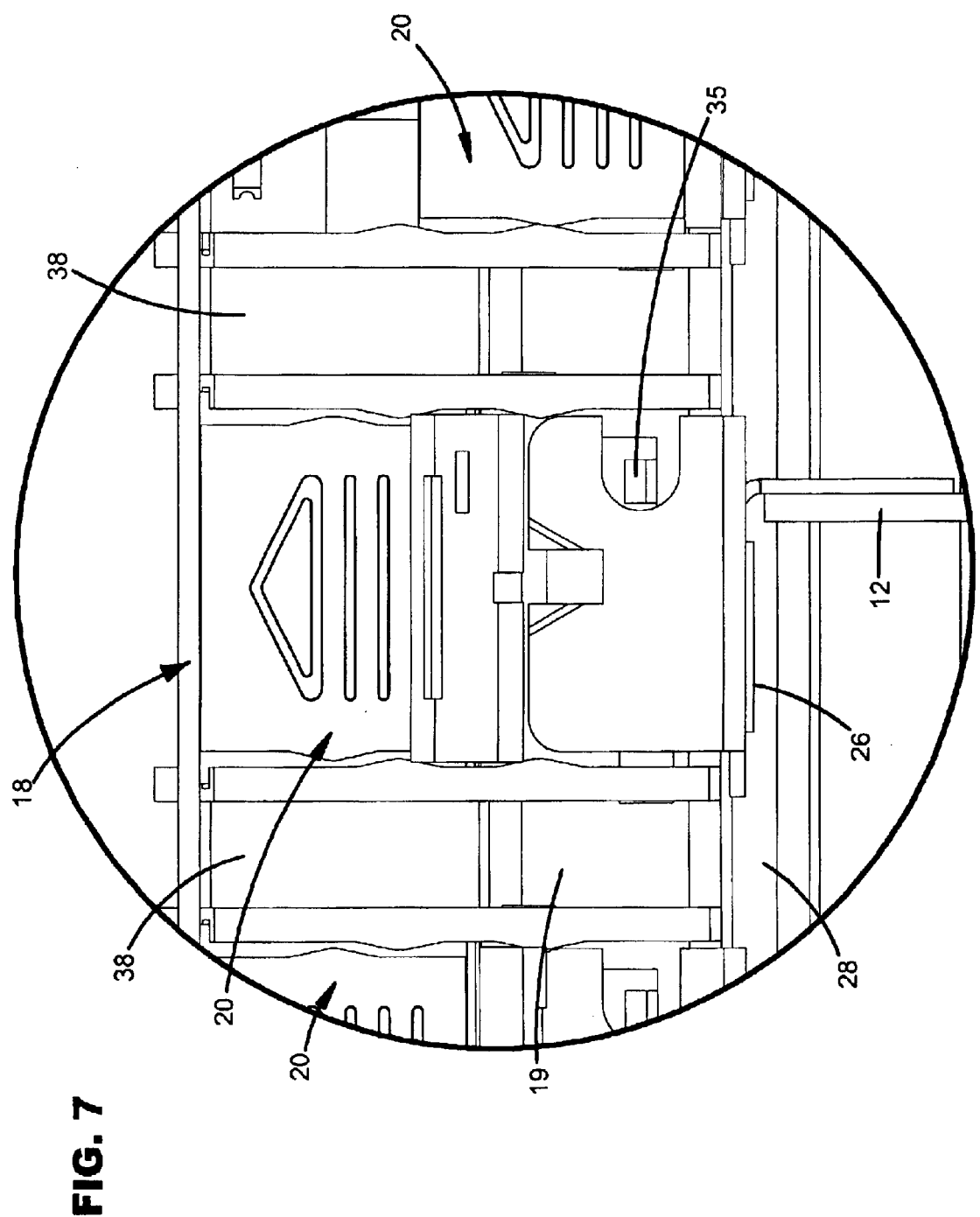
FIG. 7 is a closer view of area within the circle marked 7 of FIG. 4.

For each card slot 16 on board 14, support 18 includes a card retention device 20 and a card access opening 22. Adjacent retention device 20 for each slot is a pair of signal lamps, or LEDs 24. One of the LEDs 24 for each slot serves as a power indicator lamp, to show if power is currently being provided to the slot. The other LED 24 is a fault indicator lamp, to show if any faults in the connection or function of card 12 inserted into slot 16 have been determined. Adjacent each LED 24 is a visual access port 36. As shown in FIG. 6, described below, LEDs 24 are visible from above chassis 10 when cards 12 are mounted to slots 16. Ports 36 permit visibility of LEDs 24 from outside chassis 10 through support 18. This permits the power and fault status of each card 12 to be monitored without opening chassis 10.

Figure 2:
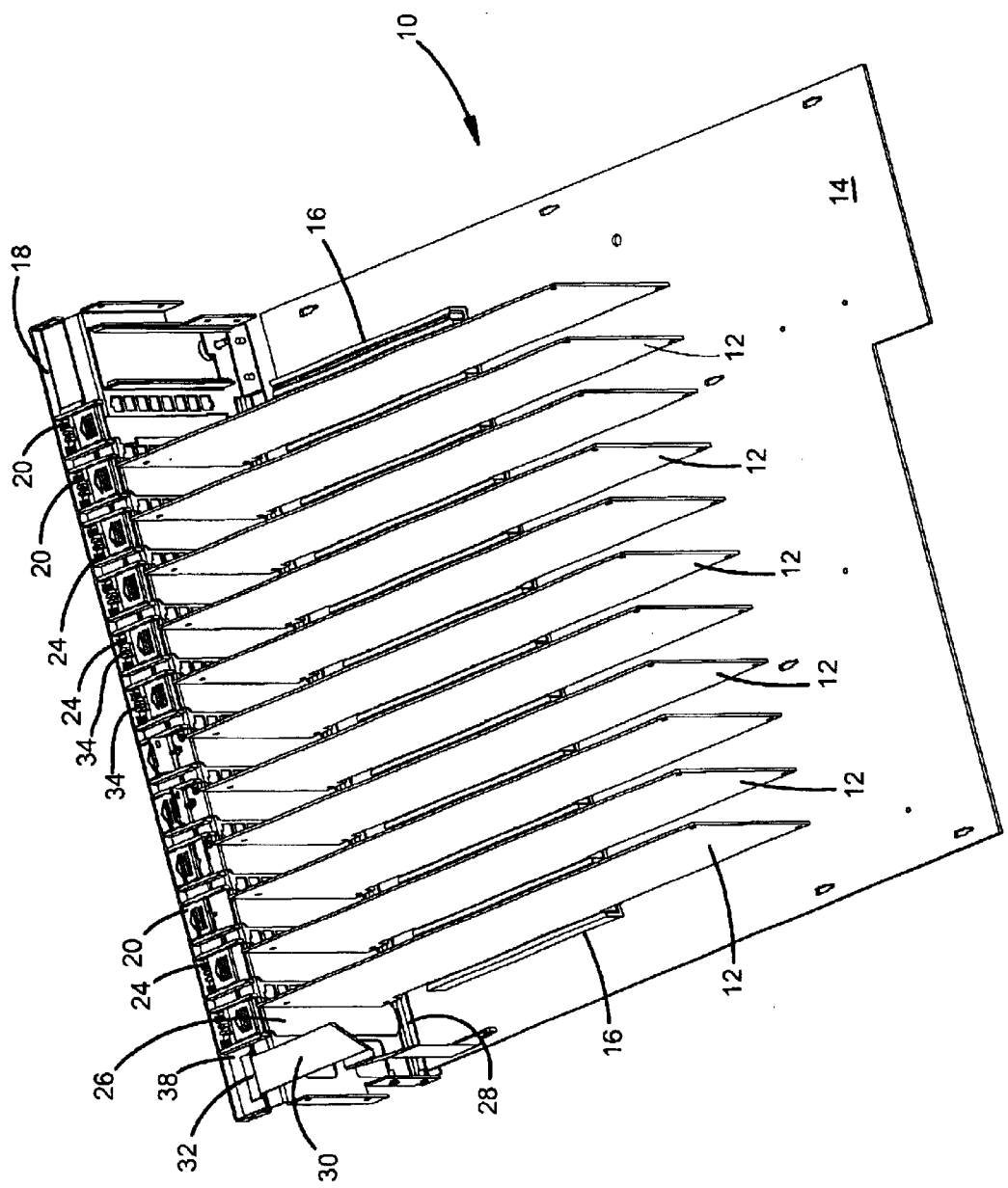
FIG. 2 is a second perspective view of the portion of the computer chassis of FIG. 1.
Figure 3:
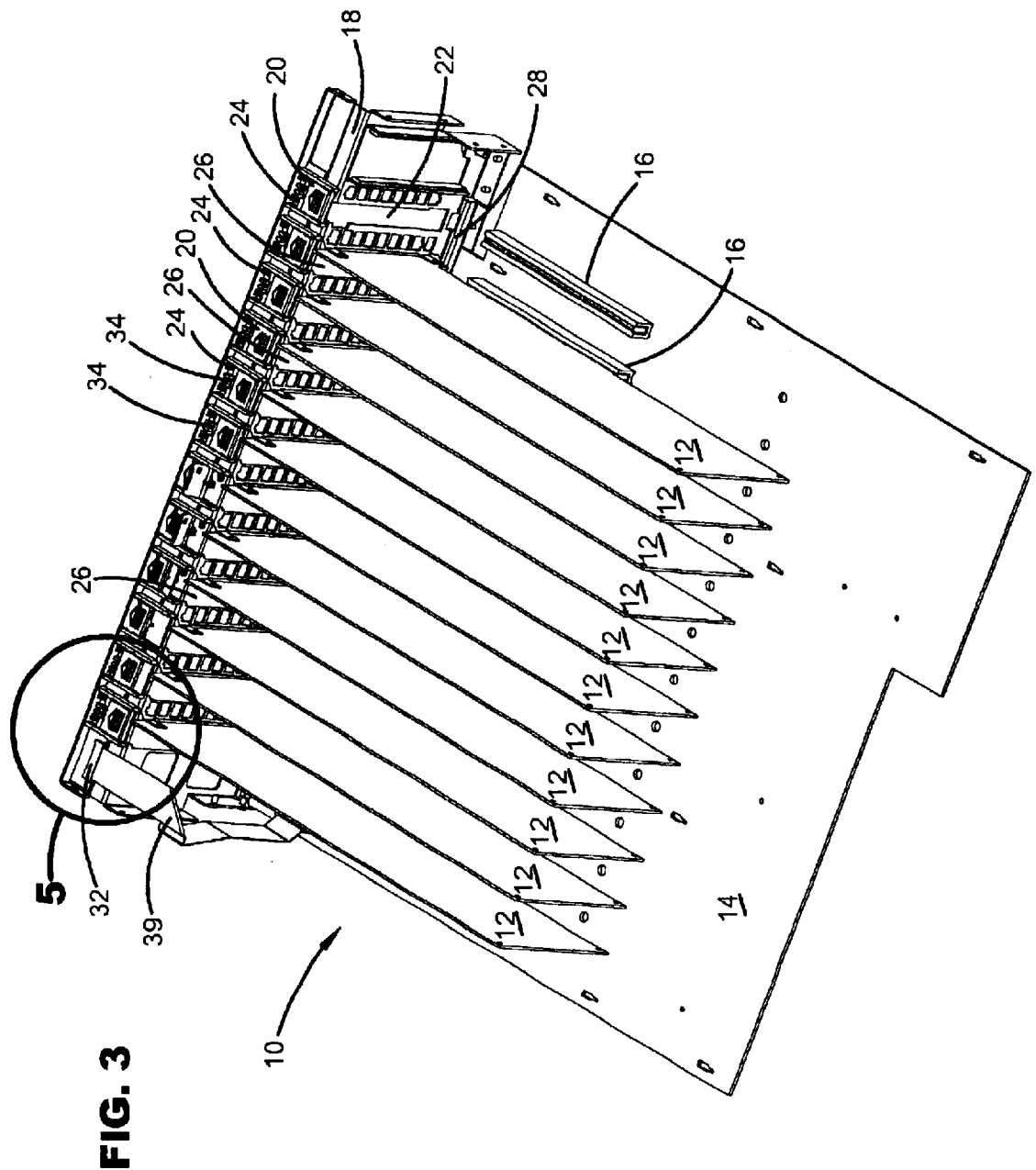
FIG. 3 is a third perspective view of the portion of the computer chassis of FIG. 1.
Figure 4:
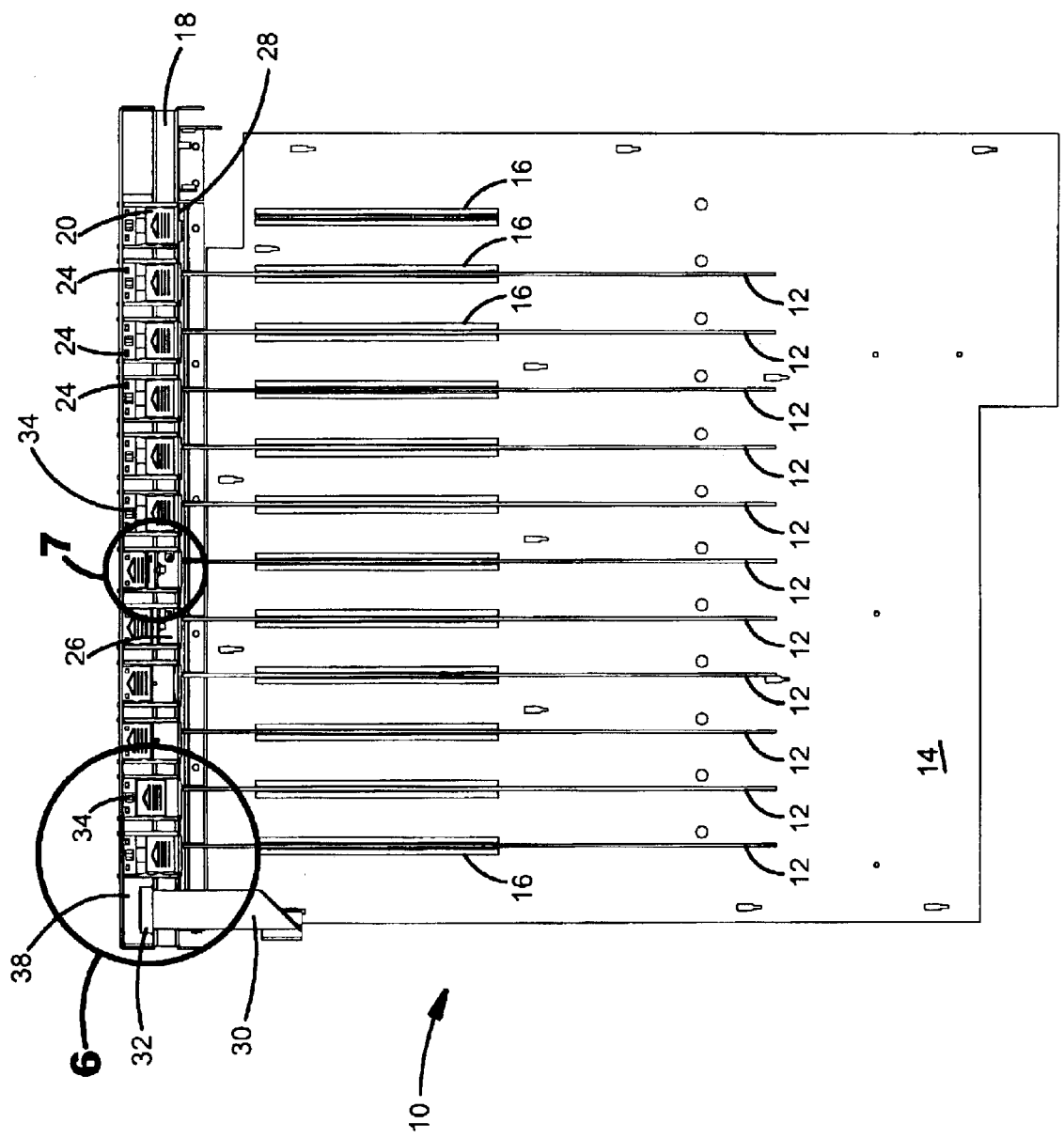
FIG. 4 is a top view of the portion of the computer chassis of FIG. 1.
Figure 5:
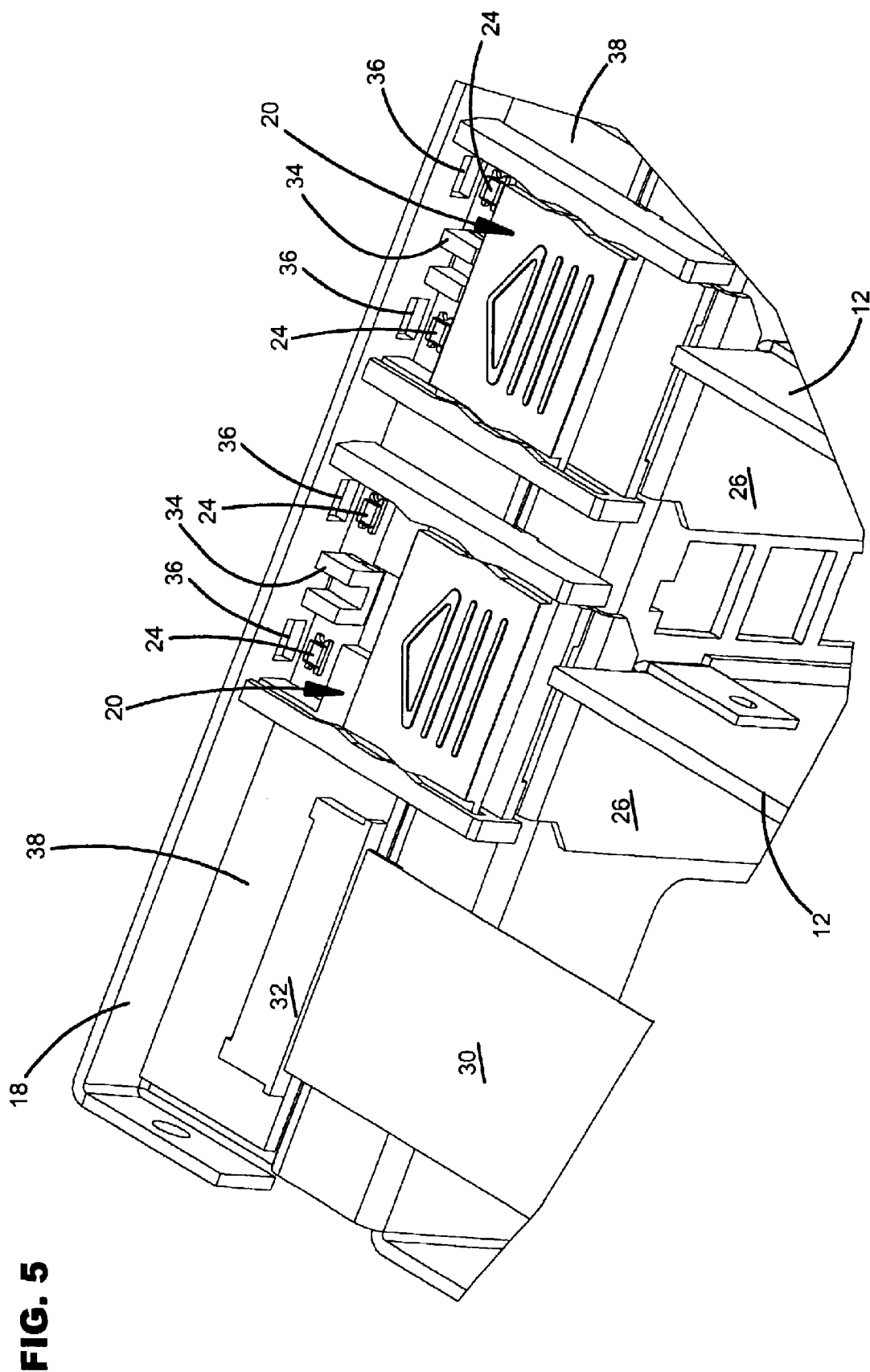
FIG. 5 is a closer view of area within the circle marked 5 of FIG. 3.
Figure 32:
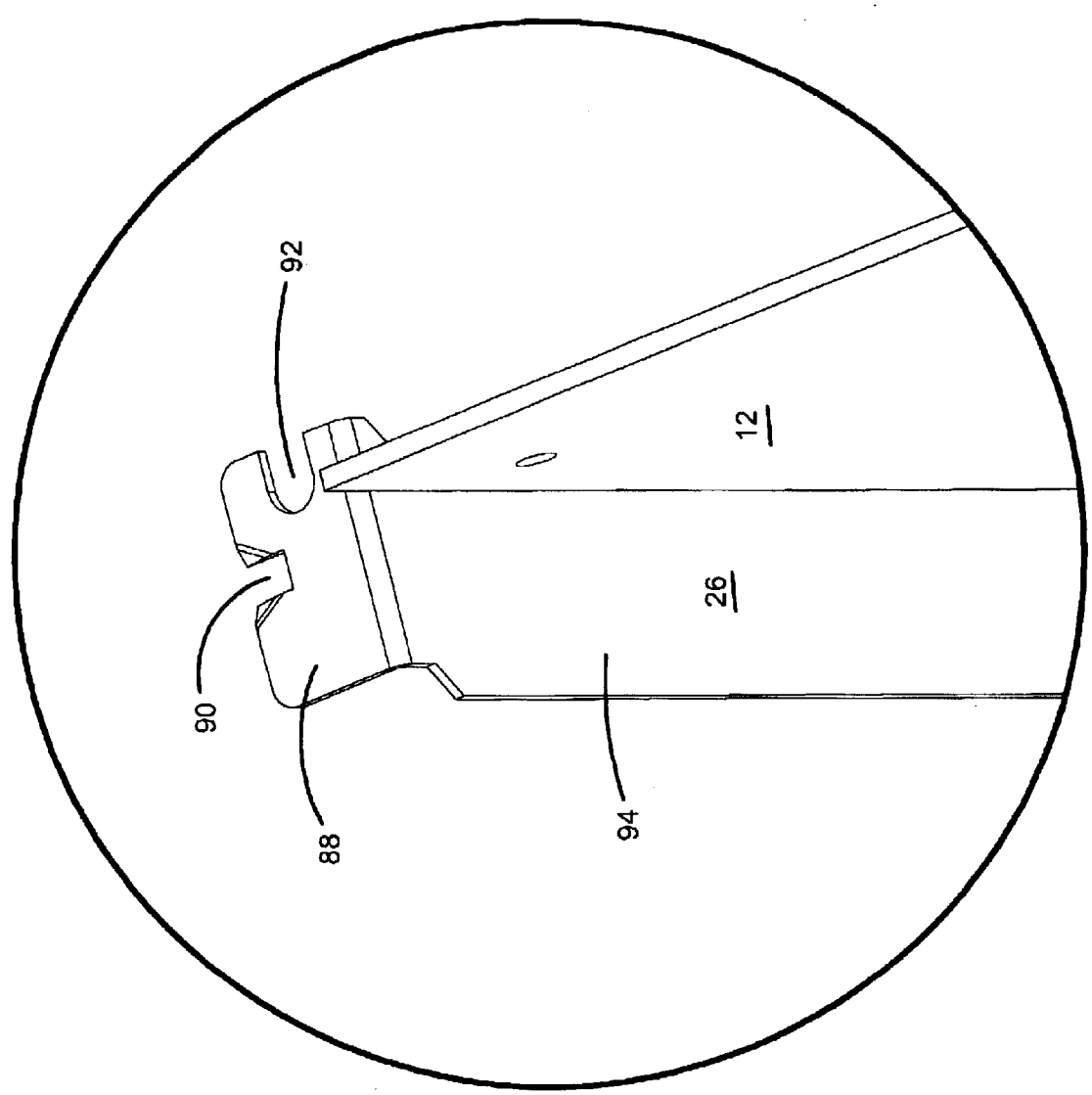
FIG. 32 is a perspective view of an expansion card and mounting bracket for use with the card retention device of the present invention.

Referring now also to FIGS. 2 and 32, each card 12 includes an end bracket 26 which cooperates with a rail 28 situated adjacent an edge of board 14 proximate support 18 and with retention device 20 to position and hold card 12 securely in slot 16. Bracket 26 occludes opening 22 when card 12 is inserted into slot 16. If the function of card 12 requires that an external connection be provided to equipment or devices mounted outside of chassis 10, a connector for linking card 12 to that external equipment or device is mounted to bracket 26. None of the cards 12 shown includes such an external connection. The external connection would be accessible from outside chassis 10 through opening 22.

Referring now to FIGS. 1 through 7, extending from board 14 is a ribbon cable 30 which is connected at a multi-pin connector 32 to a circuit board 38 mounted to support 18. Cable 30 provides electrical connections between board 14 and the LEDs 24 mounted adjacent each retention device 20. Cable 30 also provides an electrical connection between an optical switch 34 which is mounted beneath and actuated by each retention device 20 and the power supply for the associated slot 16. The LEDs 24 and optical switch 34 for each slot 16 will be mounted to circuit board 38 which extends the full width of support 18 beneath each of the card retention devices 20. Alternatively, a strip conductor (not shown) could extend the width of support 18 with the LEDs 24 and optical switch 34 of each retention device 20 mounted to an individual circuit board mounted beneath retention device 20.

Figure 8:
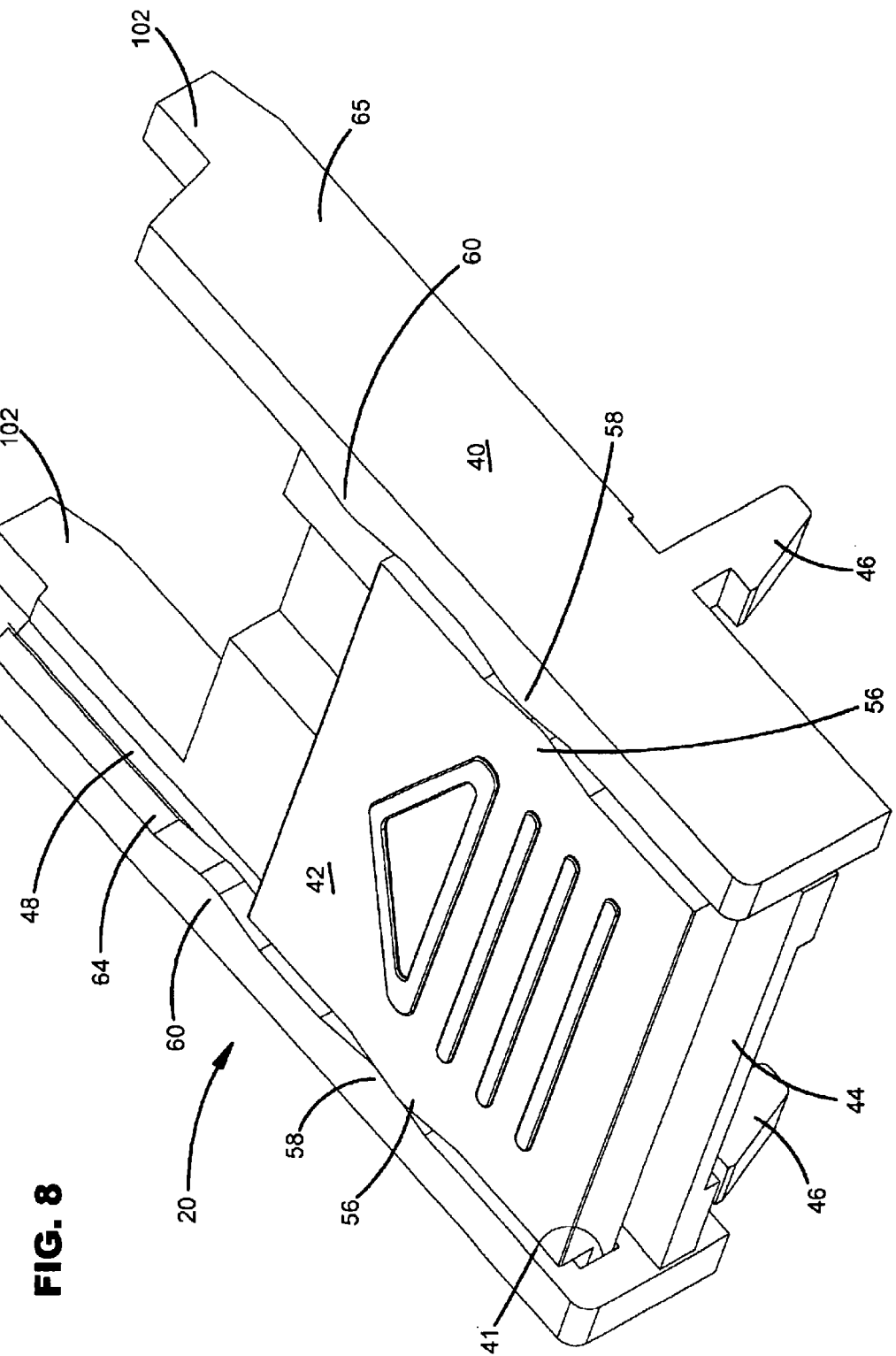
FIG. 8 is a perspective view of a card retention device according to the present invention with a slider in a locked position.
Figure 9:
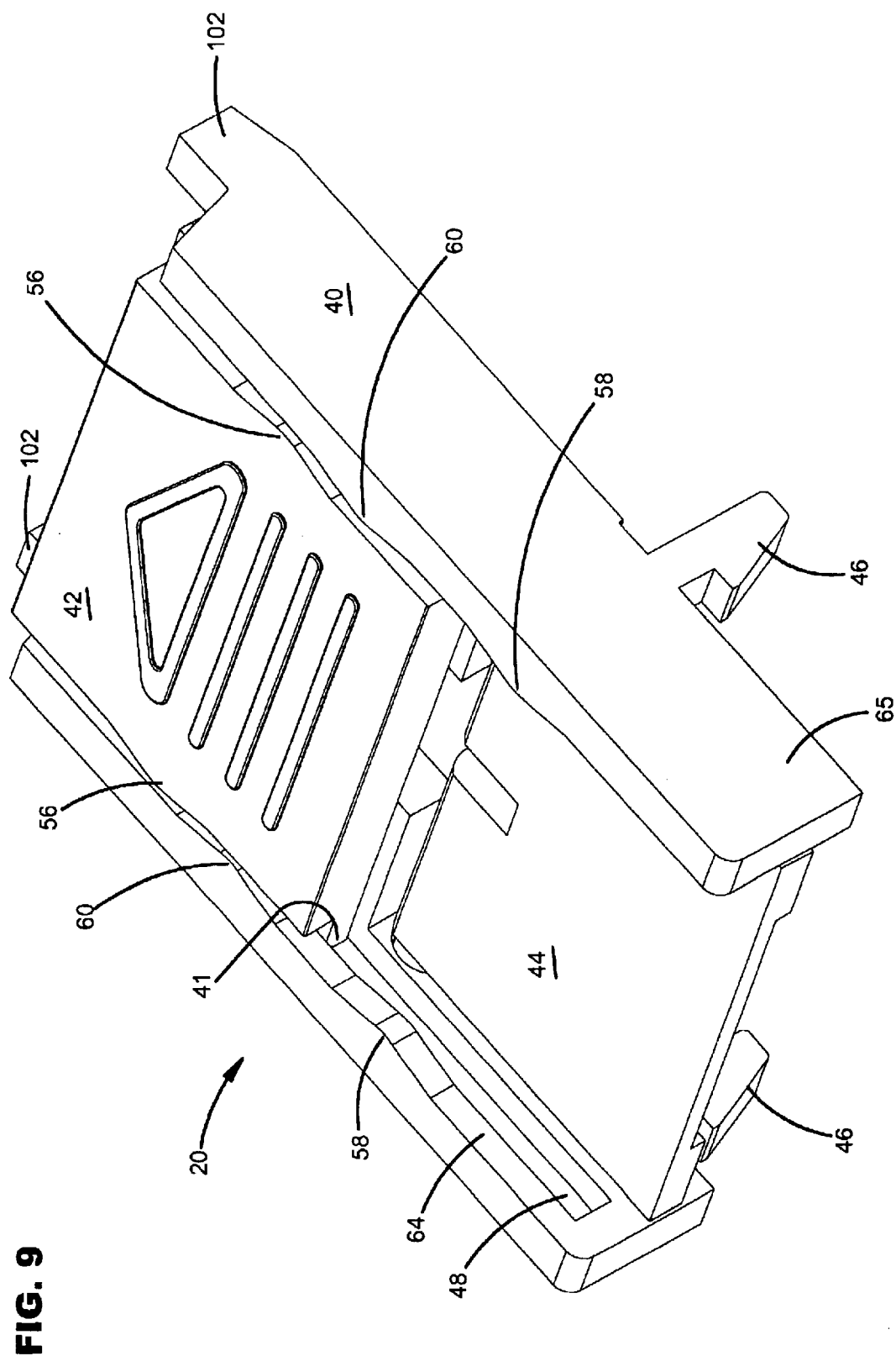
FIG. 9 is a perspective view of the card retention device of FIG. 8 with the slider moved to an unlocked position and a card holding flap in a captive position.
Figure 10:
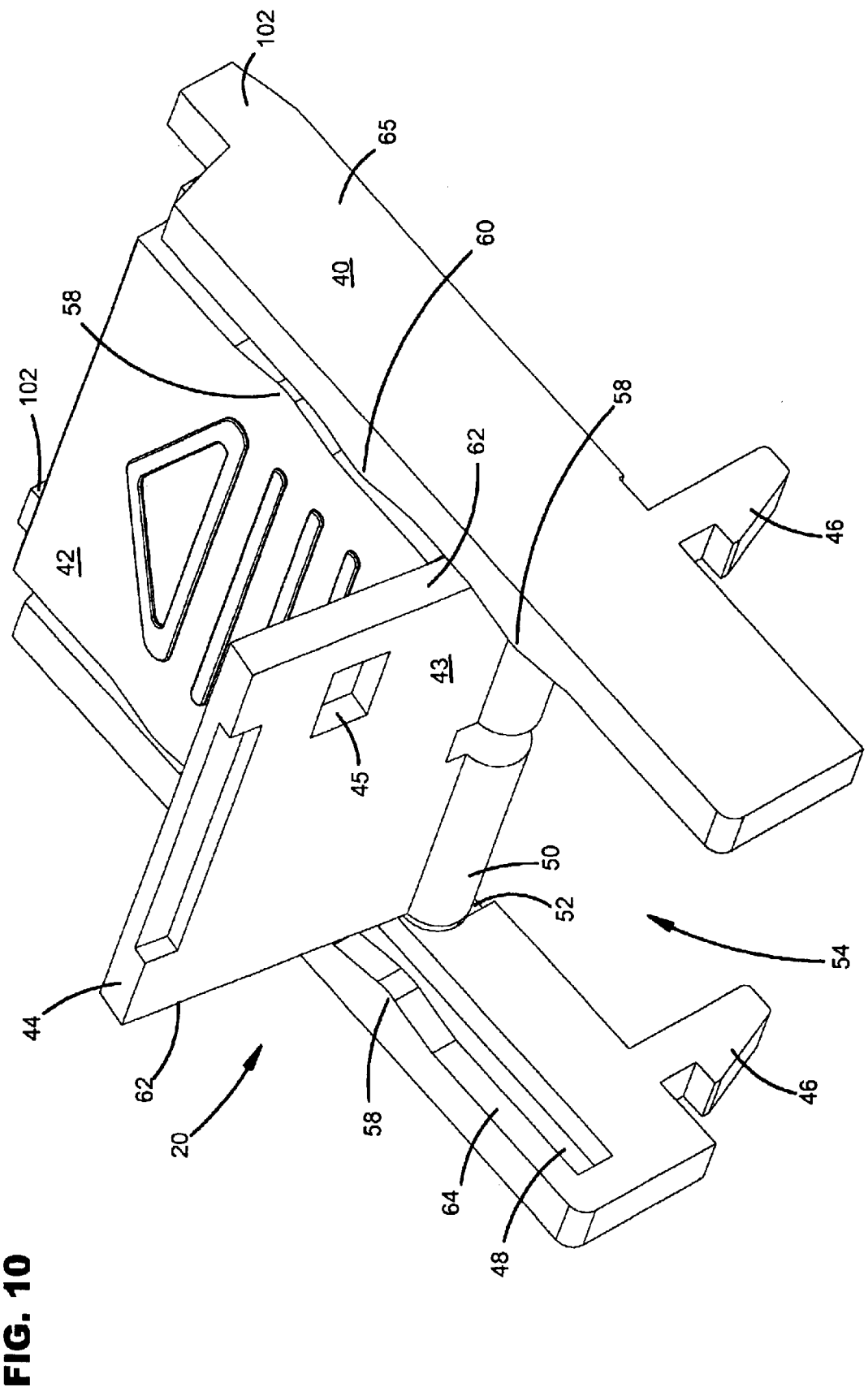
FIG. 10 is a perspective view of the card retention device of FIG. 9 with the card holding flap in a free position.
Figure 11:
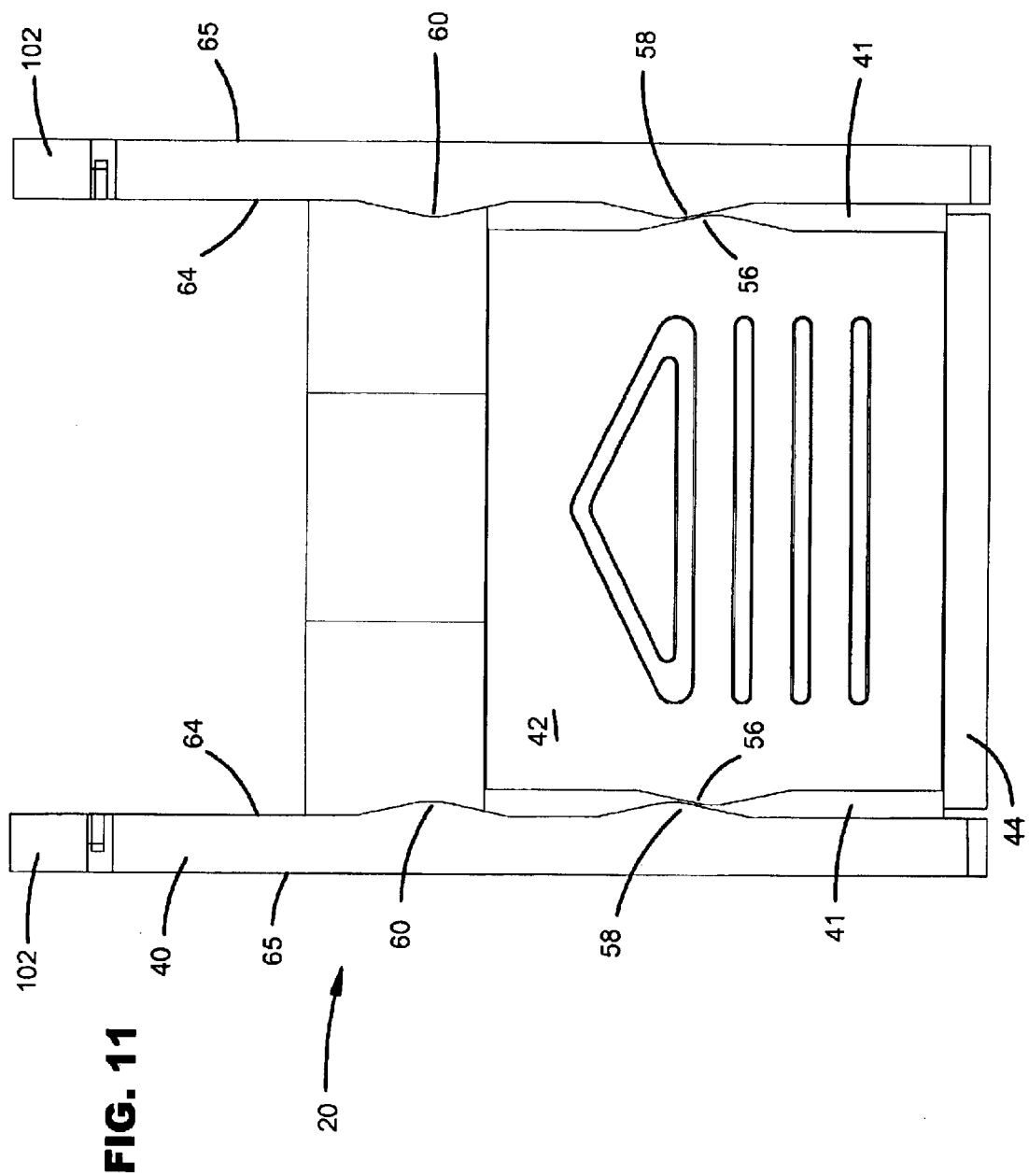
FIG. 11 is a top view of the card retention device of FIG. 8.
Figure 12:
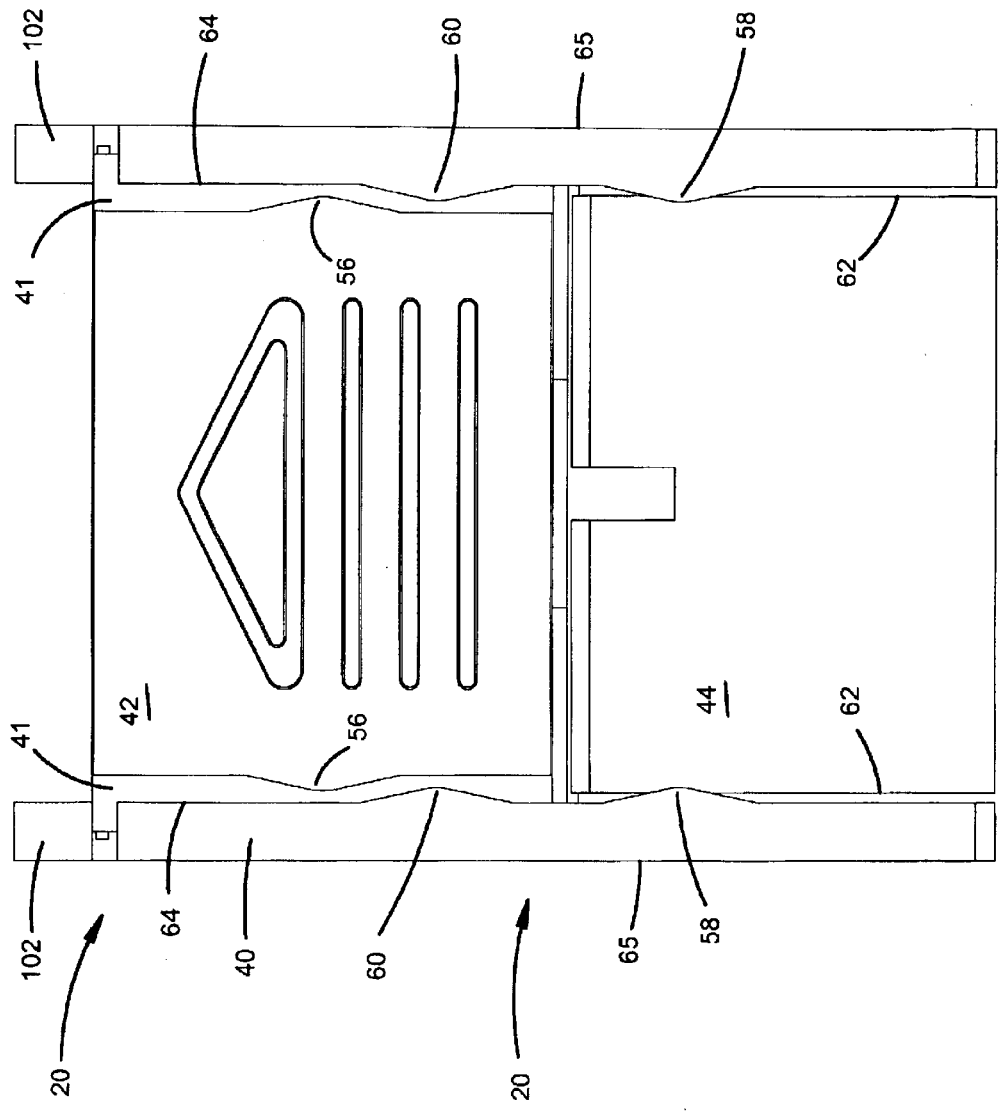
FIG. 12 is a top view of the card retention device of FIG. 9.
Figure 13:
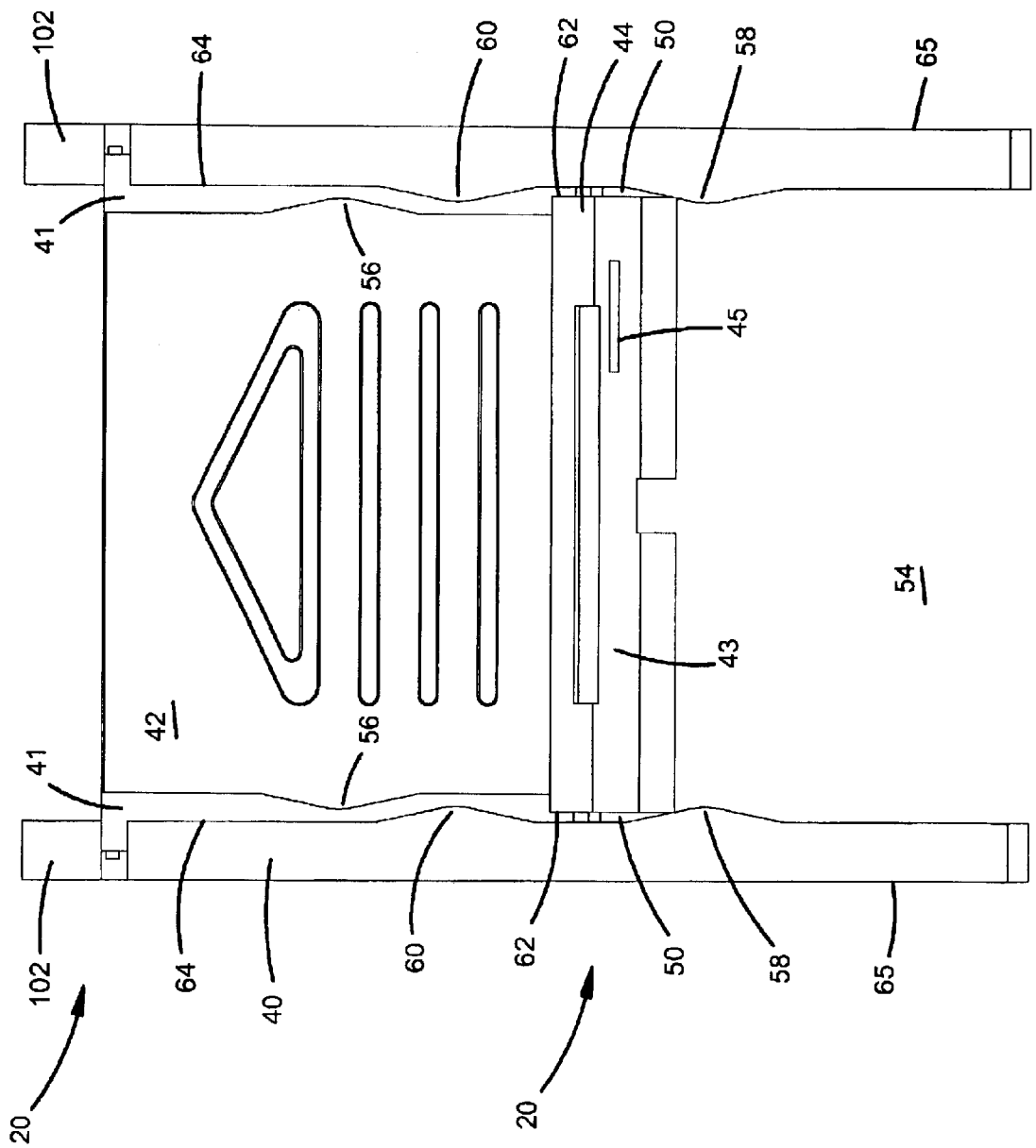
FIG. 13 is a top view of the card retention device of FIG. 10.

Referring now to FIGS. 8 through 13, retention device 20 includes a frame 40, a slider 42 and a flap 44. A pair of mounting pins 46 extend from the bottom of frame 40. Pins 46 are configured to permit snap-fit mounting of retention device 20 to support 18. FIGS. 8 and 11 illustrate retention device 20 in a locked and captive position. FIGS. 9 and 12 illustrate retention device 20 in an unlocked and captive position. FIGS. 10 and 13 illustrate retention device 20 in an unlocked and free position. Slider 42 is slidably mounted to frame 40 by a pair of extensions 41 received in a pair of slots 48 and is movable between a locked position shown in FIGS. 8 and 11 and an unlocked position shown in FIGS. 9, 10, 12 and 13. Flap 44 is pivotably mounted to frame 40 and is movable about a pivot pin 50 which received in a pivot pin slot 52 in frame 40. Flap 44 is movable between a captive position, shown in FIGS. 8, 9, 10 and 11 and a free position shown in FIGS. 10 and 13. In the free position, flap 44 permits one of the cards 12 to be inserted through an opening 54 to permit card 12 to be installed in a slot 16.

As shown in FIGS. 8 through 13, in the locked position, slider 42 holds flap 44 in the captive position. Thus configured, retention device 20 will hold one of the cards 12 in one of the slots 16 and prevent removal of card 12 from slot 16. In the captive position, a recess 45 in a lower surface 43 of flap 44 receives an alignment tab from support 18 (shown below in FIG. 33). When slider 42 is in the locked position, optical switch 34 is engaged to power up the associated slot 16. With slider 42 in the unlocked position, flap 44 may be pivoted to the free position. The moves recess away from optical switch 34 and powers down the associated slot 16 in preparation for card 12 to be removed or inserted. Movement of flap 44 to the free position also uncovers opening 54 so that card 12 can be physically removed or inserted into the associated slot 16.

Slider 42 includes a pair of opposing extensions 56 which are configured to cooperate with and engage a first pair of detents 58 and a second pair of detents 66 on an inner wall 64 of frame 40 adjacent Slots 48. First detents 58 engage extensions 56 and releasably hold slider 42 in the locked position. Second detents 60 engage extensions 56 and releasably hold slider 42 in the unlocked position. First detents 58 also engage a pair of opposing sides 62 of flap 44. As shown in FIGS. 8 and 11, first detents 58 engage sides 62 to releasably hold flap 44 in the captive position. As shown in FIGS. 10 and 13, first detents 58 engage sides 62 to releasably hold flap 44 in the free position. It is anticipated that frame 40, slider 42 and flap 44 will be made of a plastic or similarly resilient deformable material that permits the detents and sides to be moved relative to each other without permanently deformed the components.

Retention device 20 is configured and sized to permit mounting of retention devices 20 directly adjacent to one another, as shown in the FIGS., above. Side rails 66 of frame 40 include no additional protrusions along an outer wall 65 that would interfere with the mounting of adjacent retention devices 20. Retention device 20 is also sized to support a center-to-center spacing of slots 16 and thus cards 12 of as little as 0.96 inch.

Referring now to FIGS. 14 through 19, frame 40 is shown in greater detail. Frame 40 includes a pair of side rails 66 with a central cross-member extending between. In cross-member 68 is a channel 70, through which elements of slider 42 pass (described below). A pair of pins 69 extend down from cross-member 68 opposite channel 70 are may be received in openings in circuit board 38 to aid in the positioning or securing of retention device 20 to support 18.

Referring now to FIGS. 20 to 25, flap 44 is shown in greater detail. Recess 45 does not extend through the entire depth of flap 44. A slot 74 is included between pins 50 on either side of flap 44, positioned approximately equally spaced between sides 62. Slot 74 receives elements of slider 42 (described below) and when assembled is positioned adjacent channel 70 of frame 40. Pins 50 are formed on opposite sides of flap 44 and cooperate to define the axis of rotation of flap 44 as flap 44 moves between the free and captive positions when flap 44 is assembled with frame 40. A fingernail recess 72 is included along a distal edge 73 of flap 44 adjacent lower surface 43 of flap 44. Recess 72 provides a convenient location to insert a fingernail (or similarly sized tool) to urge flap 44 to move from the captive position to the free position, overcoming the resistance to movement provided by the interaction of sides 62 and first detents 58.

Referring now to FIGS. 26 through 31, slider 42 is shown in greater detail. Slider 42 includes a keel 76 extending from a first side 78. Keel 76 engages slot 74 of flap 44 of retention device 20 when slider 42 is in the locked position. Recesses 77 are formed on either side of keel 76. With slider 42 in the unlocked position, keel 76 is received in a slot 84 of switch 34 (shown in FIG. 33) and recesses 77 receive a pair of posts 86 adjacent slot 84. On a second side 82 of slider 42 are a series of raised surfaces 80. Raised surfaces 80 are configured to show a direction of movement to move slider 42 to the unlocked position as well as providing additional friction or purchase to aid in the movement of slider 42 between the locked and unlocked positions.

Referring now to FIG. 32, bracket 26 of board 12 includes an upper flange 88 and a lower plate 94. Lower plate 94 serves to block opening 22 when board 12 is installed in a slot 16 of chassis 10. Appropriate connectors as required by the circuitry upon board 12 may also be mounted to plate 94 for access from outside chassis 10 through opening 22. Circuit board 38, as shown in FIGS. 1 through 7 above, forms a shelf across the width of support 18 and upper flange 88 is positioned above circuit board 38. Upper flange 88 is further positioned beneath flap 44 within opening 54 of retention device 20. A key slot 90 is formed generally in the center of upper flange 88. An alignment opening 92 is provided in upper flange 88.

Figure 33:
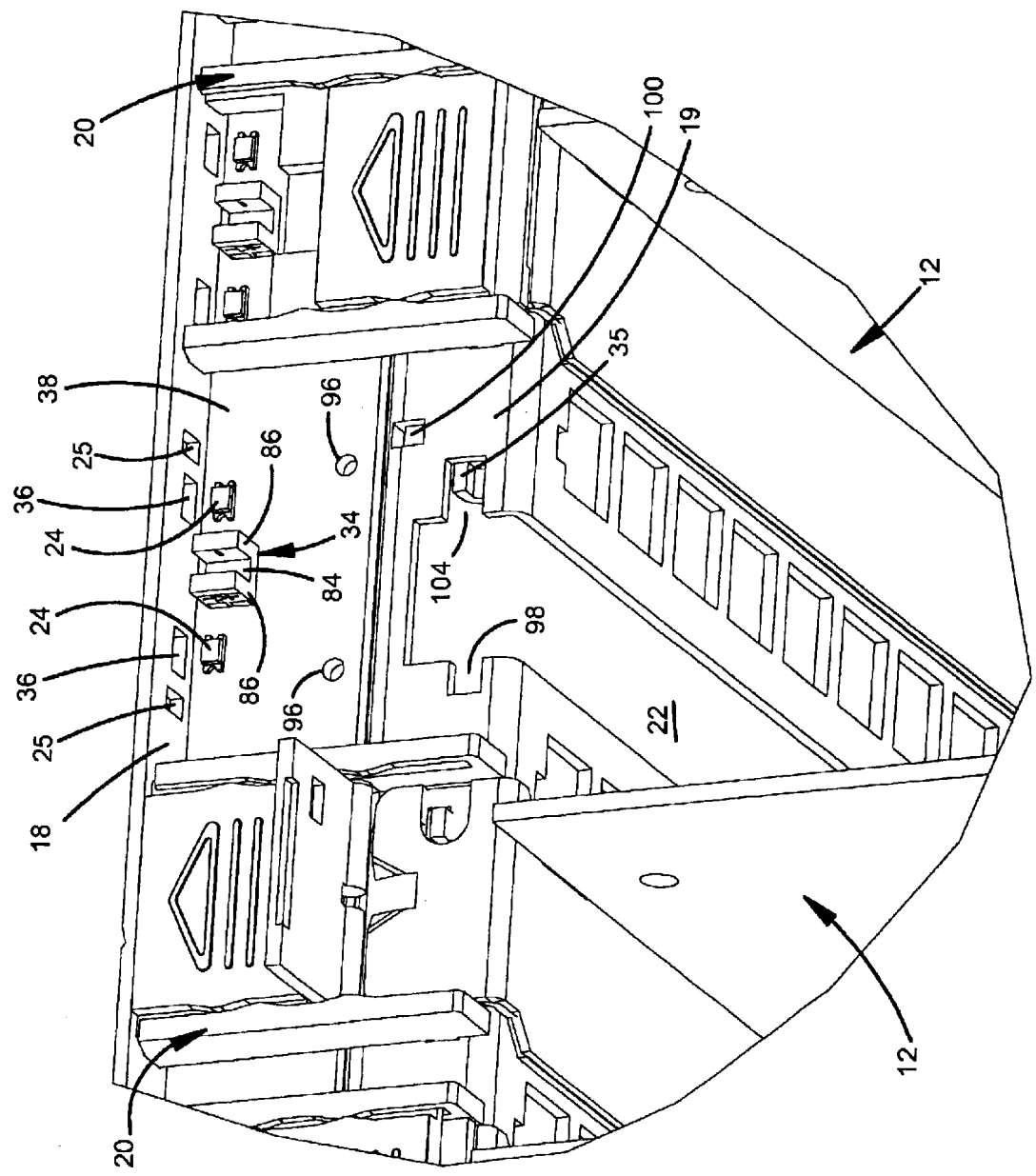
FIG. 33 is a perspective view of a portion of the computer chassis of FIG. 1 with one of the expansion cards and one of the card retention devices removed.

Referring now to FIG. 33, switch 34, as described above, includes posts 86 with slot 84 defined between posts 86. A light source is mounted to a wall of one of the posts 86 toward slot 84. Opposing the light source is a sensor mounted on the wall of the other posts 86. When keel 76 is received between posts 86 into slot 84, i.e., when slider 42 is moved to the unlocked position, keel 76 breaks the light passage between the light source and the sensor. This signals that the power supply to the corresponding slot 16 be turned off. When keel 76 is not within slot 84, the sensor can receive light from the light source, which signals that the power supply to the corresponding slot 16 be turned on.

While optical switch 34 has been characterized as an optical switch, it is anticipated that a micro-switch or other type of mechanically actuated switch 134 may be also be used with retention device 20 as described herein. The actuation of switch 134 would be initiated by the movement of keel 76 into or out of slot 84, where keel 76 would move a mechanical switch mounted within slot 84.

A pair of openings 25 are defined in support 18 for each retention device 20. Openings 25 receive mounting extensions 102 of frame 40. A pair of openings 96 are defined in circuit board 38 for each retention device 20. Openings 96 receive the alignment pins 69 in the bottom of each retention device 20 to ensure that each retention device 20 is relatively aligned with one of the switches 34. Circuit board 38 rests on a shelf 19 which is part of support 18. Opening 22 also extends partially across shelf 19. A mounting recess 98 is formed in one side of opening 22 in shelf 19. Recess 98 is sized to receive and releasably mate with one of the mounting pins 46 extending from the bottom of retention device 20. A separate mounting recess 100 is also formed in shelf 19 to releasably receive the other of the mounting pins 46 extending from the bottom of retention device 20. The combination of openings 25 with extensions 102, openings 96 with alignment pins 69, and openings 98 and 100 with mounting pins 46 cooperate to accurately position, and securely and releasably mount retention device 20 to support 18.

An alignment tab 35 extends upward through a second recess 104 in opening 22 in shelf 19, opposite recess 98. Alignment tab 35 extends upward through alignment opening 92 in upper flange 88 when card 12 is inserted into slot 16 to aid in the positioning of card 12. When card 12 is inserted fully into slot 16, upper flange 88 extends across shelf 19 to circuit board 38 but does not overlay circuit board 38. The upper portion of tab 35 in then received in recess 45 in flap 44 when flap 44 is in the captive position.

With regard to the foregoing description, it is to be understood that changes may be made in detail, especially in matters of the construction materials employed and the shape, size and arrangement of the parts without changing the scope of the present invention. It is intended that the specification and depicted aspects be considered exemplary only, with the true scope and spirit of the invention being indicated by the broad meaning of the following claims.

What is claimed is:

1. A retention device for releasably retaining an expansion card to a computer chassis comprising:

a frame attached to the chassis above a slot configured to receive the expansion card, the frame defining an opening through which the expansion card may be inserted to engage the slot;

a flap hingedly mounted to the frame and movable between a captive position and a free position, the flap in the captive position extending across the opening to retain the expansion card within the slot and the flap in the free position permitting the expansion card to be removed from the slot; and a slider slidably mounted to the frame and movable between a locked position and an unlocked position, the slider in the locked position blocking the flap in the captive position and the slider in the unlocked position allowing the flap to move from the captive to the free position.

2. The retention device of claim 1, wherein the chassis includes an optical switch, the slider in the unlocked position occludes the optical switch and the occlusion of the optical switch shuts off electrical power to the slot.

3. The retention device of claim 1, wherein the frame includes detents to releasably hold the slider in either the locked or the unlocked position.

4. The retention device of claim 1, wherein the frame includes detents to releasably hold the flap in either the captive or the free position.

5. The retention device of claim 1, wherein the frame is mounted to a support extending from a circuit board to which the slot is mounted, and the support includes a power status indicator lamp adjacent the frame.

6. The retention device of claim 5, wherein the support includes a fault status indicator lamp adjacent the frame.

7. The retention device of claim 6, wherein the lamps are directly visible from outside the chassis.

8. The retention device of claim 1, wherein a plurality of frames are mounted above plurality of slots and the chassis is configured to receive a plurality of expansion cards.

9. The retention device of claim 8, wherein the frames are spaced to receive the expansion cards spaced less than one inch apart.

10. The retention device of claim 9, wherein the expansion cards are spaced approximately 0.96 inch center-to-center.

11. A computer chassis comprising:
at least one expansion slot for receiving an expansion card, the expansion slot having a power supply which maybe turned on or off and defining a first direction;
a card support extending adjacent an end of the at least one expansion slot in a second direction generally perpendicular to the first direction, the card support including a card retention device at a position distal the expansion slot;
the card retention device including a frame, a flap and a slider;
the-frame snapfit to the card support;
the flap hingedly mounted to the frame and movable from a captive position to a free position;
the slider slidably mounted to the frame and movable between a locked position and an unlocked position;
wherein with the slider in the unlocked position and the flap in the free position, the power supply to the slot is switched off and an expansion card may be inserted through an opening in the frame so that a first edge of the card is received in the slot and a second opposite edge of the card is adjacent the opening in the frame;
wherein with the slider in the locked position and the flap in the captive position, the power supply to the slot is switched on, and the expansion card may not be removed from the slot nor inserted through the opening into the slot;
wherein the slider in the locked position holds the flap in the captive position and the slider in the unlocked position allows the flap to move to the free position.

12. The computer chassis of claim 11, wherein a power status indicator lamp and a fault status indicator lamp are mounted adjacent the card retention device and the lamps directly visible from outside the chassis.

13. The computer chassis of claim 11, wherein the chassis includes a plurality of card retention devices and a plurality of expansion slots.

14. The computer chassis of claim 13, wherein the card retention devices are spaced apart to receive expansion cards which are spaced less than one inch apart.

15. The computer chassis of claim 14, wherein the expansion cards are spaced approximately 0.96 inch center-to-center.

16. A method of inserting an expansion card into a computer chassis comprising:
providing a card retention device mounted to a card support of the computer chassis, the chassis including a circuit board with an expansion slot for receiving the expansion card and the card retention device mounted adjacent the expansion slot;
positioning the expansion card through an opening defined by a frame of the card retention device and inserting the card into the slot;
moving a flap hingedly mounted to the frame to a captive position covering the opening of the frame, preventing the removal of the expansion card from the slot; and
moving a slider slidably mounted to the frame to a locked position holding the flap in the captive position.

17. The method of claim 16, wherein the computer chassis includes a switchable power supply to the slot and moving flap to the captive position switches on the power to the slot.

* * * * *